(12) United States Patent
French et al.

(10) Patent No.: US 7,026,794 B1
(45) Date of Patent: Apr. 11, 2006

(54) DYNAMICALLY CONTROLLED SWITCHING ALTERNATOR SYSTEM

(75) Inventors: Michael J. French, Pleasant Prairie, WI (US); Scott A. Koerner, Kenosha, WI (US)

(73) Assignee: BRP US Inc., Stutervant, WI (US)

( * ) Notice: Subject to any disclaimer, the term of this patent is extended or adjusted under 35 U.S.C. 154(b) by 142 days.

(21) Appl. No.: 10/708,084

(22) Filed: Feb. 6, 2004

(51) Int. Cl.
  *H02P 9/04* (2006.01)
(52) U.S. Cl. .................. 322/90; 322/89; 290/1 A
(58) Field of Classification Search .............. 322/26, 322/28, 89, 90; 290/1 A, 7
  See application file for complete search history.

(56) References Cited

U.S. PATENT DOCUMENTS

| | | | |
|---|---|---|---|
| 3,508,138 A | 4/1970 | Schatz | |
| 3,710,228 A | 1/1973 | Higashino | |
| 3,800,197 A | 3/1974 | Mehta | |
| 3,984,750 A * | 10/1976 | Pfeffer et al. | .................. 363/67 |
| 4,024,456 A | 5/1977 | Sato et al. | |
| 4,163,187 A | 7/1979 | Thomas | |
| 4,175,249 A | 11/1979 | Gruber | |
| 4,197,492 A | 4/1980 | Sato et al. | |
| 4,339,704 A | 7/1982 | McSparran et al. | |
| 4,375,593 A | 3/1983 | Winterbotham | |
| 4,419,618 A * | 12/1983 | Gretsch | ......................... 322/7 |
| 4,456,870 A * | 6/1984 | Rodari | ........................ 322/29 |
| 4,967,137 A | 10/1990 | Canitrot et al. | |
| 5,276,603 A | 1/1994 | Stanley | |
| 5,500,052 A | 3/1996 | Horiuchi et al. | |
| 5,625,276 A * | 4/1997 | Scott et al. | .................... 322/24 |
| 5,859,525 A | 1/1999 | Minks | |
| 6,066,941 A | 5/2000 | French | |
| 6,909,263 B1 * | 6/2005 | Xu et al. | ....................... 322/29 |
| 6,914,342 B1 * | 7/2005 | French | ..................... 290/40 R |

\* cited by examiner

*Primary Examiner*—Nicholas Ponomarenko
(74) *Attorney, Agent, or Firm*—Osler, Hoskin & Harcourt LLP

(57) ABSTRACT

A system and method to dynamically control a switching alternator is disclosed. A switching alternator system is disclosed that includes a plurality of windings configured to deliver an AC power and a plurality of switches configured to switch an electrical configuration of the plurality of windings. A processor is included that is programmed to control the plurality of switches to deliver a desired DC power.

5 Claims, 5 Drawing Sheets

DYNAMICALLY CONTROLLED SWITCHING ALTERNATOR SYSTEM

BACKGROUND OF INVENTION

The present invention relates generally to combustion engines, and more particularly, to a system and method of dynamically controlling an alternator winding configuration of a combustion engine in response to operating conditions. As such, engine operation is improved over a variety of operating conditions.

Modern recreational product engines have a variety of needs that require more electrical power. Specifically, in a recreational product, engine operation delivers power to an internal rail, from which power is directed to charge a battery, operate fuel injectors, operate fuel pumps, and the like. Furthermore, power is often directed to auxiliary systems and components such as lights, radios, CD and DVD players, televisions, and the like.

Therefore, in the design of modern recreational product engines, the quality and quantity of power delivered by the engine is of paramount importance. While it is possible to provide the higher levels of power with larger alternators that are capable of producing more current at a standard voltage level, such alternators are large, heavy, and relatively expensive. Therefore, it is advantageous to provide a hybrid alternator that is small and lightweight, yet has high power output capabilities. It is well known that the number of turns of the windings of an alternator governs the magnitude of the current that can be supplied by an alternator. When the rotor of the alternator is rotating at high speeds, providing enough power is not much a concern. However, in order to get enough power out of such an alternator at low speeds when the rotor is rotating more slowly, it is desirable for the windings to have more turns.

Therefore, in order to provide an alternator that is capable of supplying sufficient current at high and low speeds, switching alternator systems have been developed. Alternator systems, such as that described in commonly owned U.S. Pat. No. 6,066,941, include an alternator having multiple alternator coils for generating an AC power coupled through a plurality of diodes to first and second DC load buses. A plurality of switches are utilized to switch between a series winding configuration at low speeds of operation and a parallel winding configuration at high speeds of operation. That is, when in a series configuration, the windings are electrically configured so as to have numerous turns and, when in a parallel configuration, the windings are electrically configured so as to have fewer turns.

The switches are commonly thyristors that are triggered to switch by analog circuits such as an electronic control module (ECM) circuit that is configured to monitor the rotational speed of the alternator rotor. If the alternator rotor is rotating below a predetermined rotational speed, the voltage applied by the ECM circuit to the cathode of the thyristor relative to the anode is positively charged and, as such, the thyristors remain electrically closed and the windings are electrically configured to be in series. However, when the rotor of the alternator exceeds the predetermined rotational speed, the ECM circuit applies a negative charge to the cathode of the thyristors relative to the anode, which electrically switches the thyristors to open and electrically configures the windings in parallel.

While this system does provide the necessary switching alternator system adequately, it is limited in the amount and type of operational feedback that it can monitored to determine switching timing. That is, because the control circuit is an analog control circuit, adding additional feedback increases the size and complexity of the circuit correspondently. Furthermore, since the control circuit is analog, the thresholds for switching are predetermined and fixed. Therefore, the control circuit must be preconfigured to operate within a particular engine configuration and under known variable rotational speeds of the engine rotor.

It would be desirable to have a system and method for alternator switching that is dynamically adaptable to a variety of operating conditions and rotational speeds of the rotor. Furthermore, it would be desirable to have a switching system that is flexibly configurable to operate in multiple products and within different operating conditions and environmental requirements.

BRIEF DESCRIPTION OF INVENTION

The present invention provides a system and method of dynamically controlling an alternator winding configuration in response to operating conditions. At least one processor is utilized to monitor a variety of operational conditions and switch an electrical configuration of the alternator windings according to the operational conditions.

In accordance with one aspect of the current invention, a switching alternator system is disclosed that includes a plurality of windings configured to deliver an AC power. A plurality of switches is configured to switch an electrical configuration of the plurality of windings. At least one processor is included that is programmed to control the plurality of switches to deliver a desired DC power.

In accordance with another aspect of the current invention, a method of operating a switching regulator is disclosed that includes receiving an AC power from a plurality of windings of an engine having a winding configuration and determining an operating transition of the engine. The method also includes generating an interrupt signal corresponding to the operating transition and, upon receiving the interrupt signal, switching the electrical configuration of the windings.

In accordance with another aspect of the current invention, an outboard motor is disclosed that includes a powerhead having a combustion engine configured to drive a multi-mode alternator, a midsection configured for mounting the outboard motor to a watercraft, and a lower unit powered by the combustion engine to propel a watercraft. The outboard motor also includes a switching regulator configured to receive an AC power from a plurality of windings of the multi-mode alternator and deliver an operational DC power. An engine control unit (ECU) is included that is configured to control the switching regulator according to a first operation scheme upon receiving a first interrupt and a second operation scheme upon receiving a second interrupt.

Various other features, objects and advantages of the present invention will be made apparent from the following detailed description and the drawings.

BRIEF DESCRIPTION OF DRAWINGS

The drawings illustrate one preferred embodiment presently contemplated for carrying out the invention.

In the drawings.

DETAILED DESCRIPTION

Figure 1:
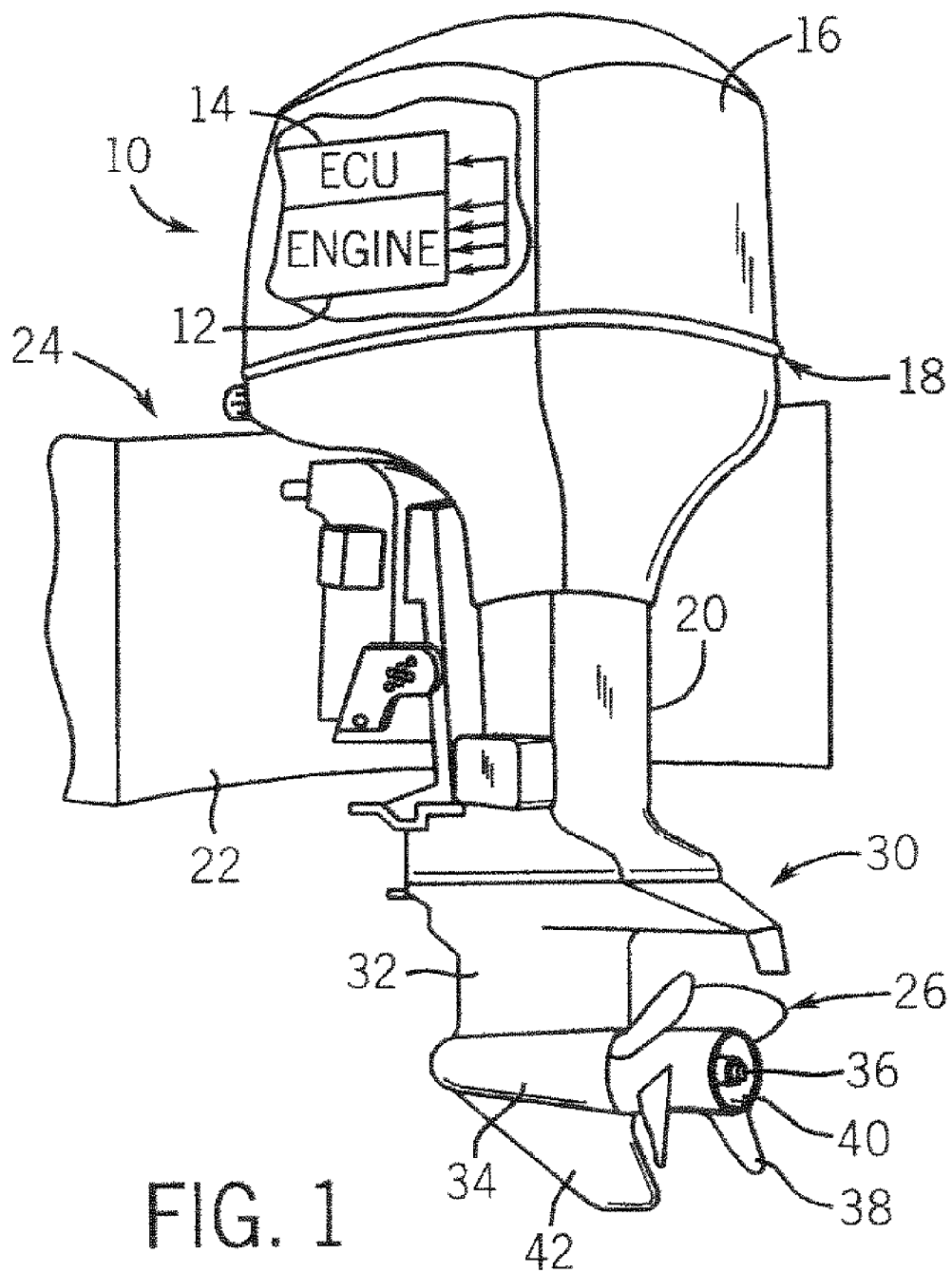
FIG. 1 is a perspective view of an exemplary outboard motor incorporating the present invention.

The present invention relates to internal combustion engines used in recreational products, and preferably, those incorporating fuel injection in a spark-ignited gasoline-type engine. FIG. 1 shows an outboard motor 10 having an engine 12 controlled by an ECU module 14 under engine cover 16. Engine 12 is housed generally in a powerhead 18 and is supported on a midsection 20 configured for mounting on a transom 22 of a boat 24 in a known conventional manner. Engine 12 is coupled to transmit power to a propeller 26 to develop thrust and propel boat 24 in a desired direction. A lower unit 30 includes a gear case 32 having a bullet or torpedo section 34 formed therein and housing a propeller shaft 36 that extends rearwardly therefrom. Propeller 26 is driven by propeller shaft 36 and includes a number of fins 38 extending outwardly from a central hub 40 through which exhaust gas from engine 12 is discharged via midsection 20. A skeg 42 depends vertically downwardly from torpedo section 34 to protect propeller fins 38 and encourage the efficient flow of outboard motor 10 through water. For purposes of this invention, engine 12 may be either a two-cycle or a four-cycle engine.

ECU module 14 is connected to a cooling loop 46 which circulates coolant into and through ECU module 14. By providing a cooling loop 46 through ECU module 14, ECU module 14 can support electrical components which previously generated too much heat to be incorporated into an ECU. As such, more of the electrical controls of an engine can be incorporated in a single component. Additionally, cooling loop 46 could circulate coolant from a closed loop cooling system of engine 12 or independent therefrom, such as directly from a body of open water. Furthermore, the cooling flow through cooling loop 46 need not be limited to the water systems of the engine but could also in constructed to be in fluid communication with an oil or fuel system of the engine.

Moreover, while many believe that two-stroke engines are generally not environmentally friendly engines, such preconceptions are misguided in light of contemporary two-stroke engines. Modern direct injected two-stroke engines and, in particular, EVINRUDE outboard motors, are compliant with not only today's emission standards, but emission standards well into the future. Further, the illustrated outboard motor has fuel injectors that are extremely fast and responsive. These injectors are not only state-of-the-art in terms of performance, they are so highly tuned that engines so equipped greatly exceed environmental emissions standards for years to come. To obtain such exacting performance, the injectors operate at a rather high voltage that is substantially greater than a rated operational voltage of a plurality of engine components, preferably 55 volts.

It should be recognized that a voltage that is "substantially greater" than a rated voltage is a voltage that may be potentially damaging if supplied to a component that is to be operated at the rated voltage. For example, if the battery configuration is to be operated at a rated voltage but is supplied with a substantially greater voltage, the battery configuration would be significantly damaged by the substantially greater or high voltage and may possibly render the battery configuration permanently inoperable. Therefore, it should be understood that a voltage that is "substantially greater" than a rated voltage is a voltage that is potentially damaging to the component operable at the rated voltage.

Figure 2:
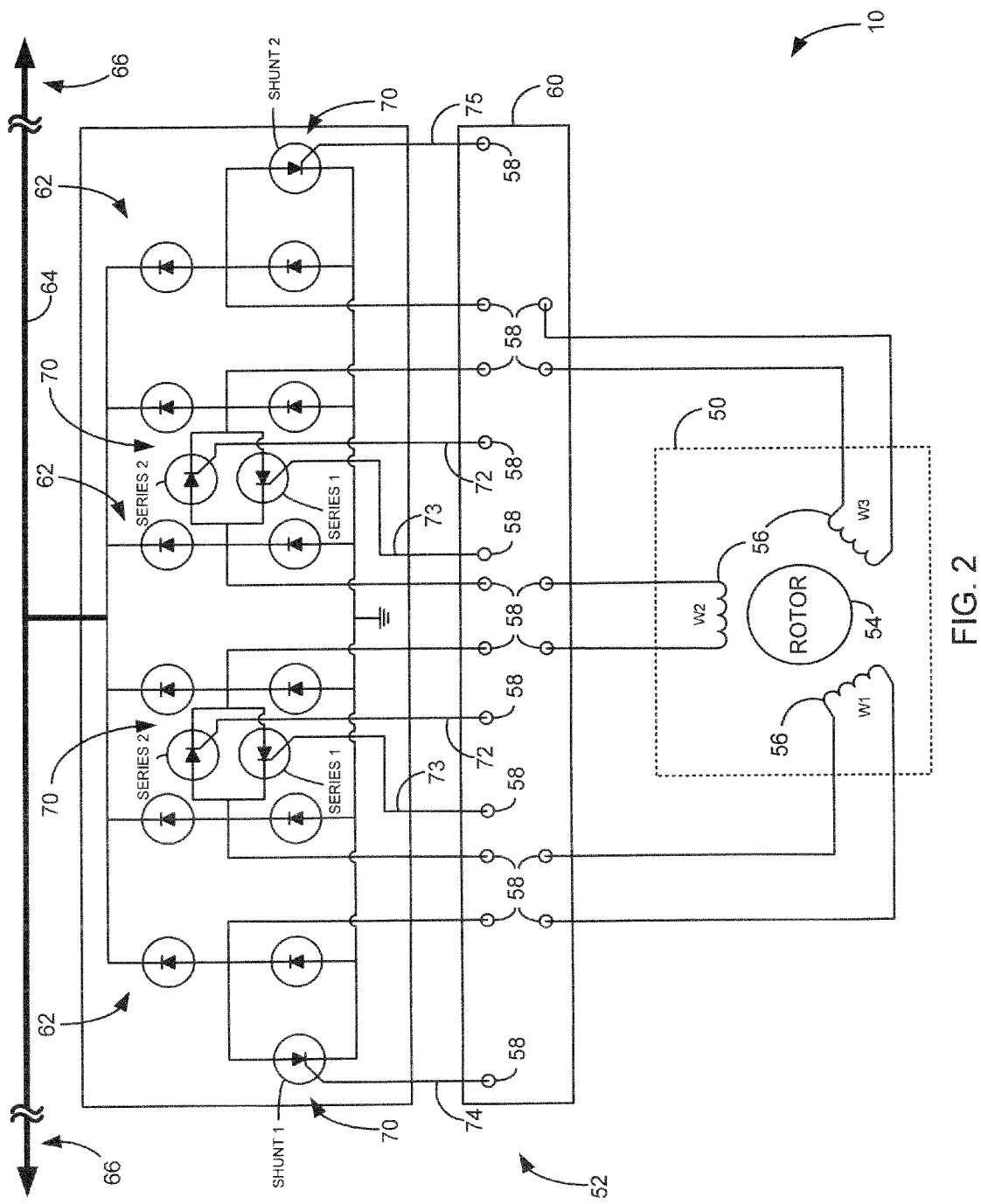
FIG. 2 is a schematic diagram of an alternator configuration and computer controlled switching regulator in accordance with the present invention.

Referring to FIG. 2, a schematic diagram of a switching alternator or multi-mode alternator assembly 48 is shown that includes an alternator configuration 50 and a computer controlled switching regulator 52 in accordance with the present invention. The alternator 50 includes a rotor 54 and plurality of windings 56, labeled W1, W2, and W3. In accordance with a preferred embodiment, three windings W1–W3 are shown, however, it is contemplated that additional windings and/or winding configurations may be utilized. The alternator 50 is connected, by way of the windings 56, to the computer controlled switching regulator 52. Specifically, each of the windings 50 is connected to a respective terminal 58 of a processor controlled switching controller 60. The processor controlled switching controller 60 is connected to a plurality of rectifiers 62 configured to convert AC power generated by the alternator 50 to DC power, which in turn, is supplied to a rail operating as a DC bus 64. It is contemplated that the processor controlled switching controller 60 may be controlled by a processor of the ECU or may be controlled by a processor contained internally within the processor controlled switching controller 60. In accordance with a preferred embodiment, the rectifiers 62 are full-bridge rectifiers, however, alternative rectifier configurations capable of rectifying AC power to DC power are also contemplated. The DC bus 64 receives the DC power from the rectifiers 62 and delivers the DC power to systems and components throughout the engine 66.

A plurality of computer controlled switches 70 is included to enable dynamic adjustments to the electrical configuration of the windings 56. Specifically, as will be described with respect to FIGS. 4 and 5, the computer controlled switches 70 are controlled by the processor controlled switching controller 60 via control lines 72, 73, 74, 75 to selectively open and close.

In accordance with a preferred embodiment, each computer controlled switch 70 includes silicon controlled rectifiers (SCRs). Specifically, two sets of opposing SCRs, labeled Series 1 and Series 2, are connected between the rectifiers 62 to selectively change an electrical configuration of the windings 56 between a series configuration, a parallel configuration, and/or a series and parallel combination configuration. The Series 1 and Series 2 SCRs are controlled via the control lines 72, 73 by application of a biasing voltage that is applied or unapplied by the processor controlled switching controller 60. Furthermore, two additional SCRs labeled Shunt 1 and Shunt 2 are included to selectively connect one end of winding W1 and winding W3 to ground. The Shunt 1 and Shunt 2 switches are controlled by the processor controlled switching controller 60 via control lines 74, 75. Therefore, each of the switches 70 are controlled by independent control lines 72–75, which enable the processor controlled switching controller 60 to independently switch the Series 1 switches, Series 2 switches, Shunt 1 switch, and Shunt 2 switch.

It should be recognized that FIG. 2 shows a plurality of SCRs, however, it is contemplated that triac SCRs, metal-oxide semiconductor field-effect transistors (MOSFETs), bipolar junction transistors (BJTs), or any other configuration of computer controllable switches may be utilized.

During operation of the engine 10, as is commonly known, the rotor 54 rotates, thereby inducing an electrical current in the windings 56. The induced current is passed, in the form of AC power, to the processor controlled switching regulator 60, which monitors the voltage and current characteristics of the AC power and passes the AC power to the rectifiers 62. As stated, the rectifiers 62 convert the AC power from the windings 56 to DC power which is supplied to the DC bus 64.

As will be described in detail with respect to FIGS. 5 and 6, the processor controlled switching regulator 60 utilizes a plurality of feedback including the voltage and current characteristics of the AC power supplied by the windings 56 to determine whether to open or close the computer controlled switches 70 and thereby change the electrical configuration of the windings 56 between a series configuration, a parallel configuration, and/or a combination of series and parallel configuration. That is, as will be shown with respect to FIG. 3, configuring the windings 56 to be electrically connected in a series configuration, a parallel configuration, or a combination of series and parallel configuration alters the power supplied to the DC bus 64 over the operating range of the engine 10. As such, the processor controlled switching regulator 60 determines the optimal winding configuration for the current operating conditions and opens and/or closes the computer controlled switches 70 to electrically configure the winding 56 to meet the power requirements of the engine over the entire operating range of the engine 10.

Specifically, when the computer controlled switches 70 are controlled by the processor controlled switching regulator 60 via control lines 72, 73, 74, 75 to be open, the windings 56 are electrically connected in parallel. However, when the computer controlled switches 70 are controlled to be closed, adjacent rectifiers 62 are electrically connected via the Series 1 and Series 2 switches while one end of winding W1 and winding W2 is grounded. As one of skill in the art will recognize, upon closing the Series 1 and Series 2 switches, the windings 56 are electrically connected in series. As will be described with respect to FIG. 3, whether the windings W1 and W3 are shunted to ground or whether the windings 56 are electrically connected in series, in parallel, or in a combination thereof significantly affects the power output delivered to the DC bus 64.

Figure 3:
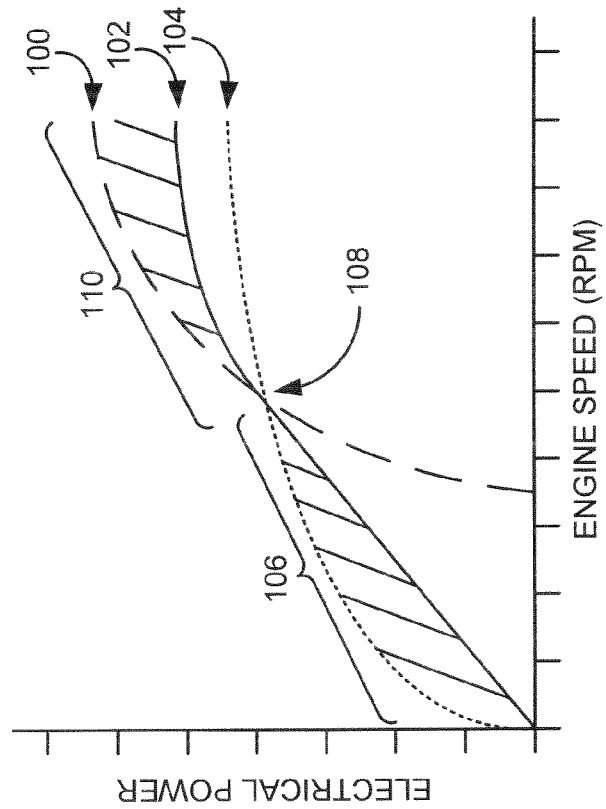
FIG. 3 is a graph illustrating a model power output of the computer controlled switching regulator over the operating engine speed range of the engine shown in FIG. 2.

Referring to FIG. 3, a graph illustrating the model power supplied to the DC bus over the operating engine speed range of the engine with respect to the electrical configuration of the windings is shown. Three specific power curves corresponding to a parallel electrical configuration 100, a general electrical operational power requirement 102, and a series electrical configuration 104 are shown.

At low engine speeds, it is preferable that the power output be greater than the general electrical operational power requirement 102. As such, it is ideal that the windings be configured to deliver power according to a lower portion 106 of the series electrical configuration 104. As such, when operating a low engine speeds, it is preferable that the windings be electrically configured in a series configuration so as to deliver power according to the lower portion 106 of the series electrical configuration 104.

As the engine speed rises, the electrical power required for optimal operation 102 increases. When engine speed exceeds a predetermined value 108, the windings of the alternator are switched to be connected in parallel such that power is delivered according to an upper portion 110 of the parallel electrical configuration 100. That is, the windings should be switched to an electrical configuration whereby the windings form an electrical equivalent of a plurality of windings each with a smaller number of turns than when in the series electrical configuration 104. Under these conditions, the power supplied by the alternator remains above the general electrical operational power requirement 102.

Accordingly, by switching the electrical configuration of the windings between series and parallel, the operational power delivered remains above the general electrical requirements of the engine 102. For illustrative purposes, FIG. 3 shows one operational transition value 108 that creates two operating ranges whereby operational power is supplied according to either the lower portion 106 of the series electrical configuration 104 or the upper portion 110 of the parallel electrical configuration 100. However, it is contemplated that additional transition values may be designated to create additional operating ranges whereby operational power is supplied according to a series and parallel combination configuration. Such a series and parallel combination configuration would then correspond to an operational range that resides between the lower portion 106 of the series electrical configuration 104 and the upper portion 110 of the parallel electrical configuration 100.

While such additional operating ranges add additional flexibility to match variations in the general electrical operational power requirements 102, there are instances within the actual operational range of the engine whereby the electrical requirements of the engine may deviate from the general electrical operational power requirements 102.

Figure 4:
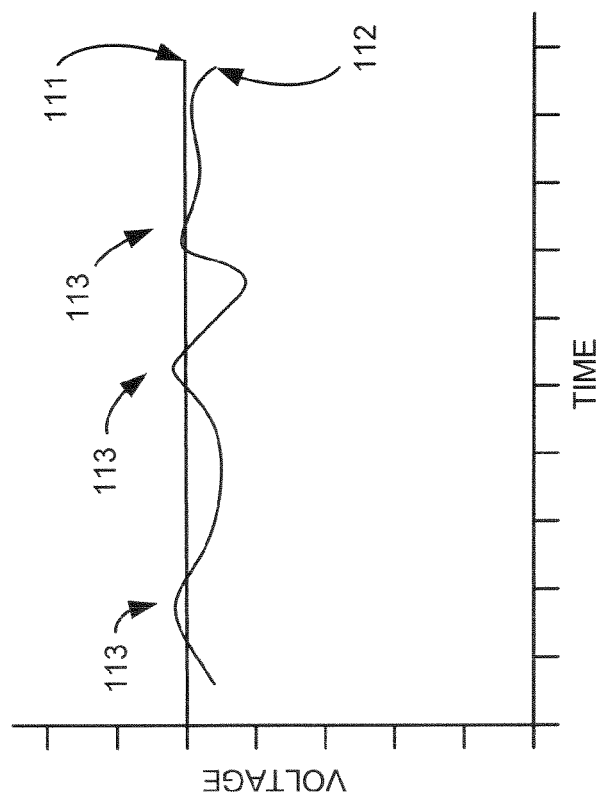
FIG. 4 is a graph illustrating an actual power output of the computer controlled switching regulator over the operating engine speed range of the engine shown in FIG. 2.

Therefore, referring now to FIG. 4, a pair of curves representing a desired DC bus voltage 111 and an actual DC bus voltage 112 over time is shown. As operating conditions change, the actual voltage 112 supplied to the DC bus varies. As long as the actual DC bus voltage 112 remains below the desired voltage 111, voltage regulation is not necessary. However, should the actual voltage spike above the desired voltage 113 voltage regulation is necessary to react to these deviations 113 from the desired voltage 111. As such, as will be described with respect to FIGS. 5 and 6, a plurality of feedback regarding engine operation is monitored and an interrupt driven control technique is implemented to dynamically control the electrical configuration of the windings according to a voltage regulation technique.

Figure 5:
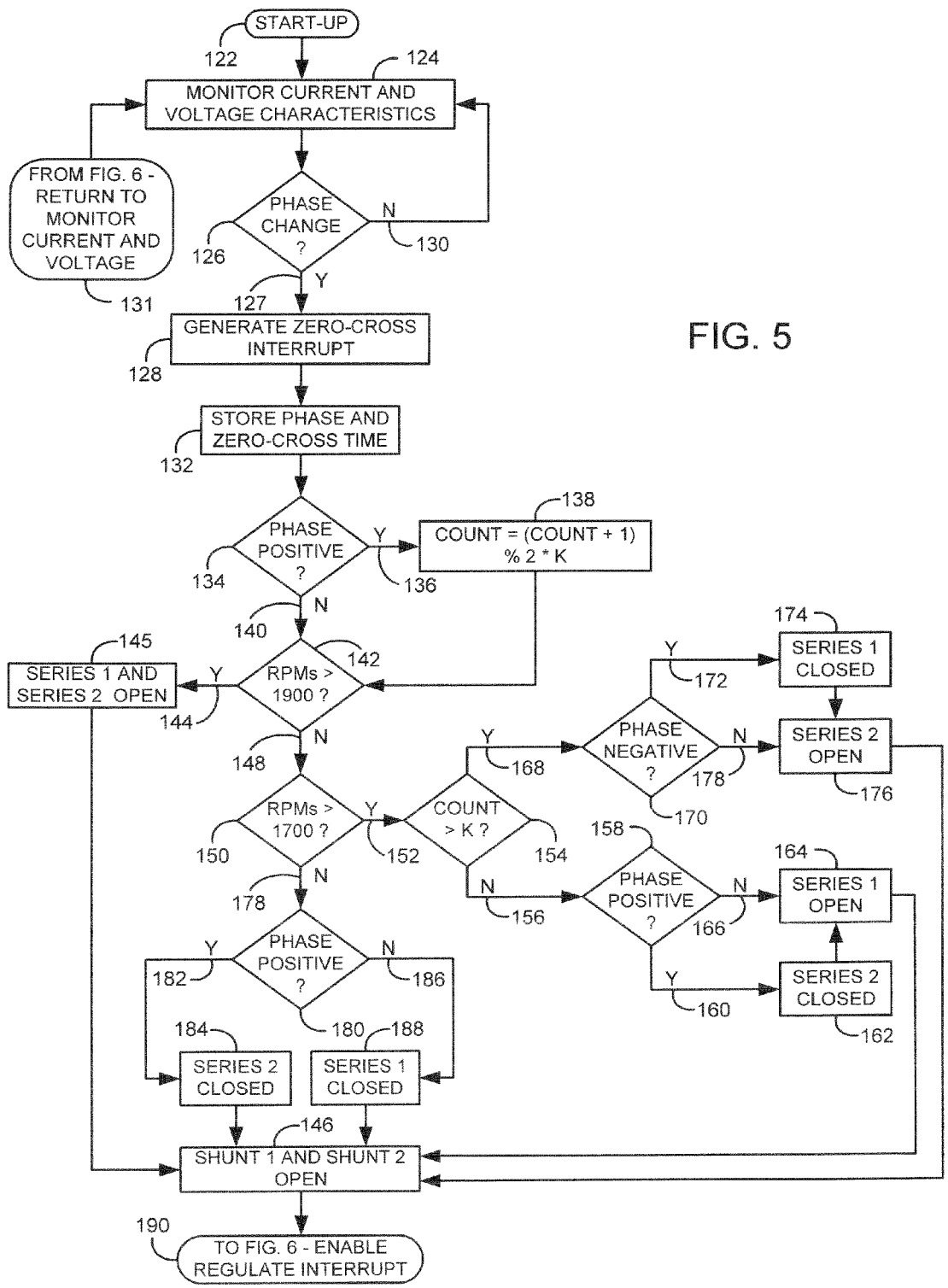
FIG. 5 is a flow chart illustrating a zero-cross control technique in accordance with the present invention and implemented by the computer controlled switching regulator shown in FIG. 2.
Figure 6:
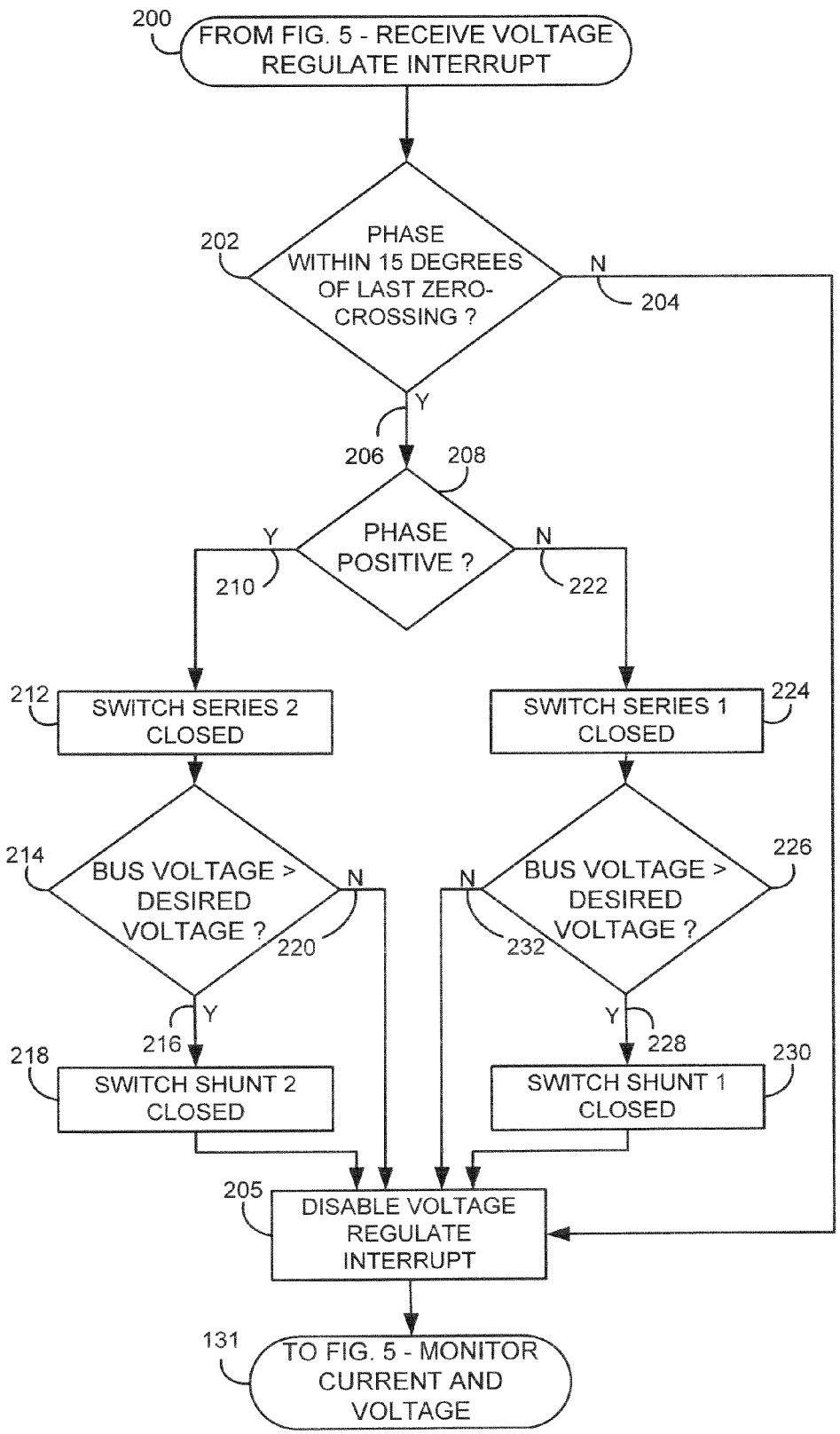
FIG. 6 is a flow chart illustrating a voltage regulation control technique in accordance with the present invention and implemented by the computer controlled switching regulator shown in FIG. 2.

Referring to FIGS. 5 and 6, the steps/acts of a switching technique are shown. As will be described, the technique is interrupt driven such that a plurality of algorithms utilized to implement a control scheme of the technique operates on demand. Specifically, two distinct types of interrupts, namely a zero-cross interrupt and a voltage regulate interrupt, are utilized for greater flexibility. However, it is contemplated that additional interrupts may be used. As will be described with respect to FIG. 5, the zero-cross interrupt is generated when the voltage delivered by the alternator is zero. The zero-cross interrupt triggers a zero-cross algorithm that is executed by the processor controlled switching regulator to switch the electrical configuration of the alternator windings without inducing voltage transients. As will be described with respect to FIG. 6, the voltage regulation interrupt is triggered when voltage regulation must occur in order to ensure a voltage within a desired voltage range is maintained on the DC bus. When the system voltage reaches a given lower threshold, the processor controlled switching regulator is caused by the voltage regulate interrupt to execute a regulate algorithm.

A variety of commands is utilized during both the zero-cross algorithm, FIG. 5, and the voltage regulate algorithm, FIG. 6. Specifically, the commands Series 1 close, Series 2 close, Series 1 open, Series 2 open, Shunt 1 close, Shunt 2 close, Shunt 1 open, and Shunt 2 open are used to switch the corresponding Series 1, Series 2, Shunt 1 and Shunt 2 switches shown in FIG. 2. By executing these commands according the following zero-cross algorithm and voltage regulate algorithm, the electrical configuration of the alternator windings is switched to and from a series configuration, a parallel configuration, and for a combination series and parallel configuration to dynamically deliver power adapted to changes in engine operating conditions.

Referring now to FIG. 5, upon engine start-up 122, the processor controlled switching regulator receives AC power from the alternator and, through hardware, monitors the voltage and current characteristics of the AC power 124 including a phase of the current waveform. From the voltage and current characteristics, the hardware determines if a phase change of the current waveform from positive to negative or negative to positive, and therefore, a zero-current cross or zero-cross, is about to occur 126 and create an ideal switching condition. That is, it is preferred to switch winding configurations at a zero-cross because if switching occurs while current is not at zero, an undesirable voltage transient can be produced due to the inductance of the wiring.

Accordingly, when a phase change occurs 127, a zero-cross interrupt is generated 128, which, as will be described, triggers execution according to a zero-cross control algorithm. However, if a phase change has not yet occurred 130, the processor controlled switching regulator continues to monitor the voltage and current characteristics 124. As will be described with respect to FIG. 6, a return from a voltage regulation technique is made to the step of monitoring current and voltage characteristics 124.

Once the zero-cross interrupt is generated by the hardware and processed by the processor controlled switching regulator 128, the processor controlled switching regulator stores the magnitude of the phase change and the particular time of the zero-cross 132. The phase of the current waveform is then evaluated to determine if the phase is positive 134. If the phase is positive 136, a count variable is reset in order to track the usage status on each winding 138. Specifically, a variable "count" is set equal to the previous value of the variable count plus an incrementation, and the modulus of that incremented value of count is taken by twice a value of a constant "k" 138. Accordingly, the count variable is incremented upon each implementation of the zero-cross algorithm if the phase of the current waveform is positive 136 until the count variable reaches twice the value of the constant k. That is, once the value of the variable count reaches twice the value of the constant k, the count is reset to zero because the remainder of 2k/2k is zero. As will be shown below, this process is taken such that the switching between the winding configurations is balanced and overheating from overuse of a particular winding is avoided. In accordance with a preferred embodiment, the constant k is set to a relatively low value, for example, 5.

Once the variable count has been set 138 or if the phase is determined to be negative 140, a revolutions per minute (RPMs) of the engine is determined 142 and if greater than 1900 RPMs 144, the Series 1 and the Series 2 switches of FIG. 2 are switched to the open position by the processor controlled switching regulator 145. Accordingly, the Shunt 1 and Shunt 2 switches are switched open 146.

However, if the RPMs of the engine are determined to be less than 1900 RPMs 148, the processor controlled switching regulator determines whether the RPMs are greater than 1700 RPMs 150. If the RPMs are greater than 1700 RPMs 152, the processor controlled switching regulator determines whether the variable count is less than the constant k at 154. If the variable count is not less than k at 156, then the current load configuration on the windings is not yet above the predetermined limit, as held by the constant k. The phase is again checked to determine whether the phase is positive 158 and if so 160, the Series 2 switches are closed 162 and the Series 1 switches are opened 164. However, if the phase is negative 166, only the Series 1 switches are opened 164. Following the opening of the Series 1 switches 164, the Shunt 1 switch and the Shunt 2 switch are opened 146.

Referring back to the determination of whether the variable count is less than the constant k 154, if the variable count is greater than the constant k 168, then the current load configuration on the windings is above the predetermined limit, as held by the constant k. The phase of the current is then checked to determine whether the phase is negative 170. If the phase is negative 172, the Series 1 switches are closed 174 and the Series 2 switches are opened 176. However, if the phase is positive 178, only the Series 2 switches are opened 176. Following the opening of the Series 2 switches 176, the Shunt 1 switch and the Shunt 2 switches are opened 146.

Referring back to the determination of whether the engine RPMs are greater than 1700 RPMs 150, if the RPMs of the engine are determined to be less than 1700 RPMs 178, the phase is again checked to determine whether the phase is positive 180. If the phase is positive 182, the Series 2 switches are closed 184 and the Shunt 1 switch and the Shunt 2 switch are opened at 146. However, if the phase is negative 186, the Series 1 switches are closed 188 and then the Shunt 1 switch and the Shunt 2 switch are opened at 146. The zero-cross algorithm ends by enabling the voltage regulate interrupt 190.

Referring now to FIG. 6, once the voltage regulate interrupt is received 200, the processor controlled switching regulator determines whether the phase of the current is within 15 degrees of the last zero-crossing 202. If the current phase is not within 15 degrees of the most recent zero-crossing 204, the voltage regulate interrupt is disabled 205 and, as described with respect to FIG. 5, current and voltage monitoring is continued until another zero-cross is detected and a zero-cross interrupt is generated.

However, if the phase is within 15 degrees of the last zero-crossing 206, the phase value is reviewed to determine whether it is positive 208. If the phase is positive 210, the Series 2 switches are closed 212. At this point, the voltage supplied to the DC bus, shown in FIG. 2, is checked to determine whether the DC bus voltage is above a maximum operating voltage 214. In accordance with a preferred embodiment, the maximum operating voltage of the DC bus is preferably 55 volts but may be higher or lower. That is, other voltages above and below 55 volts are contemplated. If the DC bus voltage is above the desired maximum voltage 216, the Shunt 2 switch is closed 218 and the voltage regulate interrupt is disabled 205. On the other hand, if the DC bus voltage is not above the desired maximum voltage 220, the Shunt 2 switch is not closed and the voltage regulate interrupt is immediately disabled 205.

Referring back to the review of the magnitude of the phase 208, if the phase is not positive 222, the Series 1 switches are closed 224 and the DC bus voltage is checked to determine whether it is above a desired maximum operating voltage 226. If the DC bus voltage is above the desired maximum voltage 228, the Shunt 1 switch is closed 230 and the voltage regulate interrupt is disabled 205. On the other hand, if the DC bus voltage is not above the desired maximum voltage 232, the Shunt 1 switch is not closed and the voltage regulate interrupt is immediately disabled 205. Once the voltage regulate interrupt is disabled 205, current and voltage monitoring is continued, as described with respect to FIG. 5, until another zero-cross is detected and a zero-cross interrupt is generated.

As the above-described technique utilizes a microcontroller and software to control the operation of the switches, the system is able to precisely control switching conditions and only switch during a zero-current condition. Additionally, it is ensured that each winding is used equally so as to prevent overheating of one winding. Furthermore, the utilization of a software based control scheme adds flexibility to the design, making possible the use of the same hardware with different software configurations for different end products, as well as switching and regulation control schemes that vary based on environmental and operational parameters.

That is, as the above-described interrupts and algorithms reside as programmed instructions stored for implementation by the processor-controlled switching regulator, the specific parameters reviewed, the switching timings, and/or the thresholds may be readily augmented and controlled to meet varied and evolving switching requirements. For example, the above-described interrupts and algorithms may be readily altered to meet new environmental requirements or to drive differing recreational products.

It is contemplated that the above-described technique may be embodied as a switching alternator system that includes a plurality of windings configured to deliver an AC power and a plurality of switches configured to switch an electrical configuration of the plurality of windings. At least one processor is included that is programmed to control the plurality of switches to deliver a desired DC power.

It is further contemplated that the above-described technique may be embodied as a method of operating a switching regulator including receiving an AC power from a plurality of windings of an engine having a winding configuration and determining an operating transition of the engine. The method also includes generating an interrupt signal corresponding to the operating transition and, upon receiving the interrupt signal, switching the electrical configuration of the windings.

It is also contemplated that the above-described technique may be embodied as an outboard motor that includes a powerhead having a combustion engine configured to drive a multi-mode alternator, a midsection configured for mounting the outboard motor to a watercraft, and a lower unit powered by the combustion engine to propel a watercraft. The outboard motor also includes a switching regulator configured to receive an AC power from a plurality of windings of the multi-mode alternator and deliver an operational DC power. An engine control unit (ECU) is included that is configured to control the switching regulator according to a first operation scheme upon receiving a first interrupt and a second operation scheme upon receiving a second interrupt.

The present invention has been described in terms of the preferred embodiment, and it is recognized that equivalents, alternatives, and modifications, aside from those expressly stated, are possible and within the scope of the appending claims. While the present invention is shown as being incorporated into an outboard motor, the present invention is equally applicable with other recreational products, some of which include inboard motors, snowmobiles, personal watercrafts, all-terrain vehicles (ATVs), motorcycles, mopeds, power scooters, and the like. Therefore, it is understood that within the context of this application, the term "recreational product" is intended to define products incorporating an internal combustion engine that are not considered a part of the automotive industry. Within the context of this invention, the automotive industry is not believed to be particularly relevant in that the needs and wants of the consumer are radically different between the recreational products industry and the automotive industry. As is readily apparent, the recreational products industry is one in which size, packaging, and weight are all at the forefront of the design process, and while these factors may be somewhat important in the automotive industry, it is quite clear that these criteria take a back seat to many other factors, as evidenced by the proliferation of larger vehicles such as sports utility vehicles (SUV).

The present invention has been described in terms of the preferred embodiment, and it is recognized that equivalents, alternatives, and modifications, aside from those expressly stated, are possible and within the scope of the appending claims.

The invention claimed is:

1. An outboard motor comprising:
   a powerhead having a combustion engine configured to drive a multi-mode alternator, a midsection configured for mounting the outboard motor to a watercraft, and a lower unit powered by the combustion engine to propel a watercraft;
   a switching regulator configured to receive an AC power from a plurality of windings of the multi-mode alternator and deliver an operational DC power; and
   an engine control unit (ECU) configured to control the switching regulator according to a first operation scheme upon receiving a first interrupt and a second operation scheme upon receiving a second interrupt.

2. The outboard motor of claim 1 wherein the first operation scheme includes a first configuration of the plurality of windings and the second operation scheme includes a second configuration of the plurality of windings.

3. The outboard motor of claim 1 wherein the ECU is selectively configurable to control the switching regulator according to at least one of a configuration of the outboard motor and a set of environmental parameters.

4. The outboard motor of claim 1 wherein the first interrupt is a zero-cross interrupt and the second interrupt is a voltage regulation interrupt.

5. The outboard motor of claim 1 wherein the ECU is further configured to determine at least one of a phase of the AC power generated by the combustion engine, a number of phase transitions of the AC power generated by the combustion engine, a winding load on each of the plurality of windings, and a revolutions per minute (RPM) of the combustion engine.

* * * * *